United States Patent [19]
Colan et al.

[11] Patent Number: 5,794,828
[45] Date of Patent: Aug. 18, 1998

[54] RACKING SYSTEM FOR TRANSPORTING A BICYCLE

[76] Inventors: Peter V. Colan, 10125 Raindrop Cir.; Randy J. Long, 11963 Bergamot Dr., both of Granger, Ind. 46530

[21] Appl. No.: 695,587

[22] Filed: Aug. 12, 1996

[51] Int. Cl.⁶ .................................................. B60R 9/10
[52] U.S. Cl. ........................ 224/530; 224/42.38; 224/924
[58] Field of Search .............................. 224/924, 42.4, 224/42.39, 42.38, 533, 530

[56] References Cited

U.S. PATENT DOCUMENTS

| | | | |
|---|---|---|---|
| 4,702,401 | 10/1987 | Graber et al. | 224/924 |
| 5,042,705 | 8/1991 | Johansson | 224/924 |
| 5,421,495 | 6/1995 | Bubik et al. | 224/924 |
| 5,435,475 | 7/1995 | Hudson et al. | 224/924 |
| 5,476,203 | 12/1995 | Fletcher | 224/924 |
| 5,570,825 | 11/1996 | Cona | 224/924 |

Primary Examiner—Renee S. Luebke
Attorney, Agent, or Firm—Brett A. Schenck

[57] ABSTRACT

A racking system for transporting a bicycle comprising a framework upon which the bicycle is mounted. A pair of telescoping arms, adjustable in length, are pivotally connected to the framework and removably secured to the seat post of the bicycle. The arms extend downwardly from the bicycle to the framework on opposite sides of the bicycle for laterally supporting the bicycle. The racking system further includes a tension mechanism having a tightening strap extending through the front wheel of the bicycle and through a cam buckle which is attached to an anchor strap to the framework for tightening the bicycle to the framework. The cam buckle frictionally engages the tightening strap to tighten the strap at the desired tension. The tension mechanism and the arms are configured and positioned to distribute the load on the bicycle so that the bicycle, frame, arms and tension mechanism are in a state of static equilibrium. The arms can be pivotally moved down to the frame to be secured to the frame in a stowed position.

6 Claims, 13 Drawing Sheets

RACKING SYSTEM FOR TRANSPORTING A BICYCLE

BACKGROUND OF THE INVENTION

The present invention relates to a racking system for a bicycle which can be attached to a vehicle. Current racking systems for bicycles use a variety of mechanisms to secure the bicycle to the framework of the racking system. However, these systems often are designed simply to loosely secure the bicycle to the rack for carrying the bicycle. Thus, damage to the bicycle and/or transport vehicle may result from the bicycle hitting the vehicle and/or rack. Further, these systems are generally limited in their ability to accommodate different bicycle sizes, styles and designs.

SUMMARY OF THE INVENTION

Hence it is an object of the invention to provide a racking system for a bicycle that rigidly secures the bicycle upon the framework of the rack to prevent damage to the bicycle and/or vehicle during transportation of the bicycle.

It is another object of the present invention to provide a racking system for a bicycle which can accommodate bicycles of different sizes, styles and designs.

It is another object of the present invention to provide a racking system for a bicycle that is easy to use.

The present invention achieves these objectives by having a racking system for a bicycle comprising a framework upon which the bicycle is mounted. A pair of arms is secured to the framework and removably secured to the bicycle. The arms extend downwardly from the bicycle to the framework on opposite sides of the bicycle for laterally supporting the bicycle.

The racking system further includes a tension mechanism connected to the framework and the bicycle for tightening the bicycle to the framework. The tension mechanism and the arms are configured and positioned to distribute the load on the bicycle so that the bicycle, framework, arms and tension mechanism are in a state of static equilibrium. The tension mechanism includes a tightening strap extending through the front wheel of the bicycle and through a cam buckle, which is attached by an anchor strap to the framework. The cam buckle frictionally engages the tightening strap to lock the strap at the desired tension. A side-release buckle is connected between two strap ends to permit the strap to be extended through the front wheel when it is unbuckled.

The arms are telescoping such that they are adjustable in length to accommodate bicycles of different sizes. In the preferred embodiment, the arms are removably secured on or near the seat post of the bicycle to accommodate bicycles of different frame construction, since most bicycles typically have a similar near-vertical seat post of a common diameter which slides inside the bicycle frame. The arms are pivotally connected to the framework so that they can be disconnected from the bicycle and pivotally moved down to the framework to be secured to the framework in a stowed position. The framework is secured to a vehicle and can be adapted to mount onto receiver hitches, bumpers, hoods, or any other appropriate surface of a vehicle.

BRIEF DESCRIPTION OF THE DRAWINGS

Theses and other features, aspects and advantages of the present invention will become better understood with regard to the following description, appended claims, and accompany drawings where:

2

FIG. 15 is a side view of the embodiment of the racking system of FIG. 14, securing a bicycle and being mounted to the receiver hitch of the vehicle; and.

DETAIL DESCRIPTION OF THE INVENTION

Figure 1:
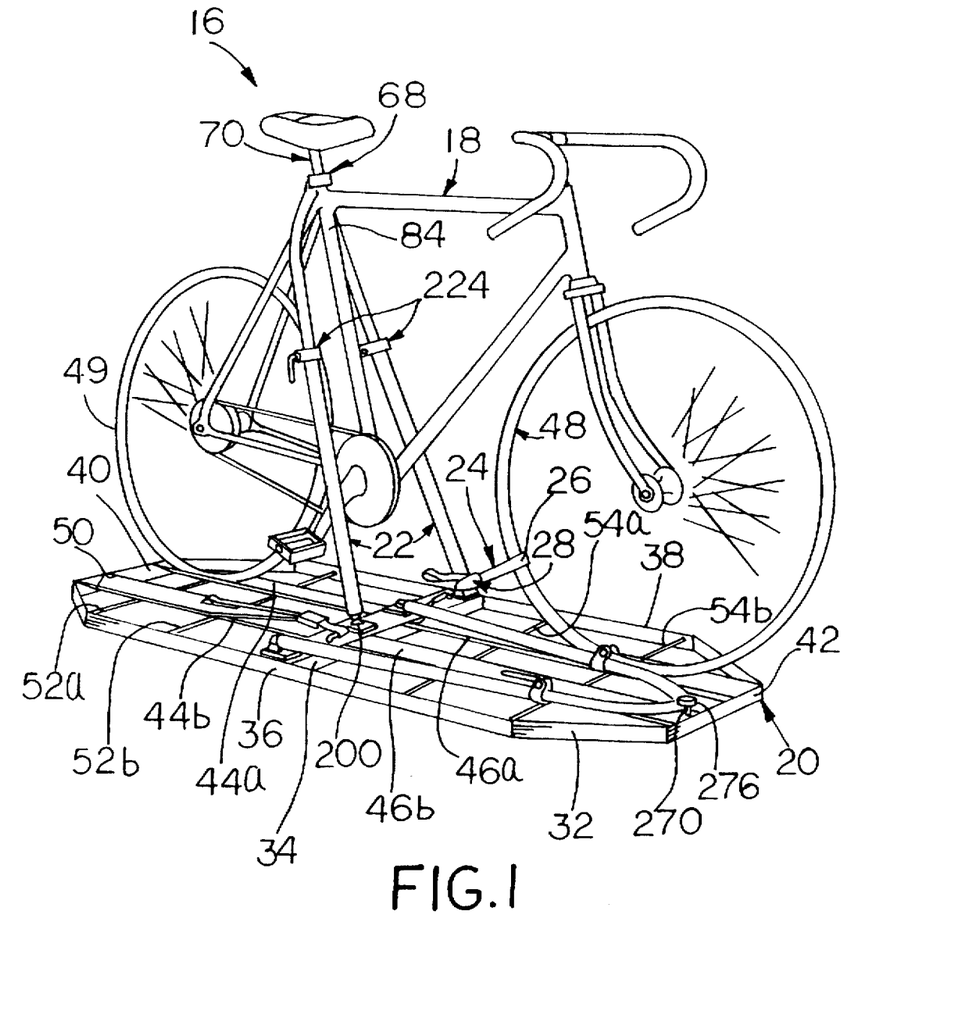
FIG. 1 is a perspective view of a version of the racking system of the present system securing a bicycle mounted thereon.

Referring to FIG. 1, the racking system 16 is shown in which a bicycle 18 is mounted to a generally horizontal framework 20 by a pair of telescoping arms 22 and a tensioning mechanism 24 (FIG. 7) comprising a pair of flexible straps 26, 27 and cam and side-release buckles 28, 29.

Figure 12:
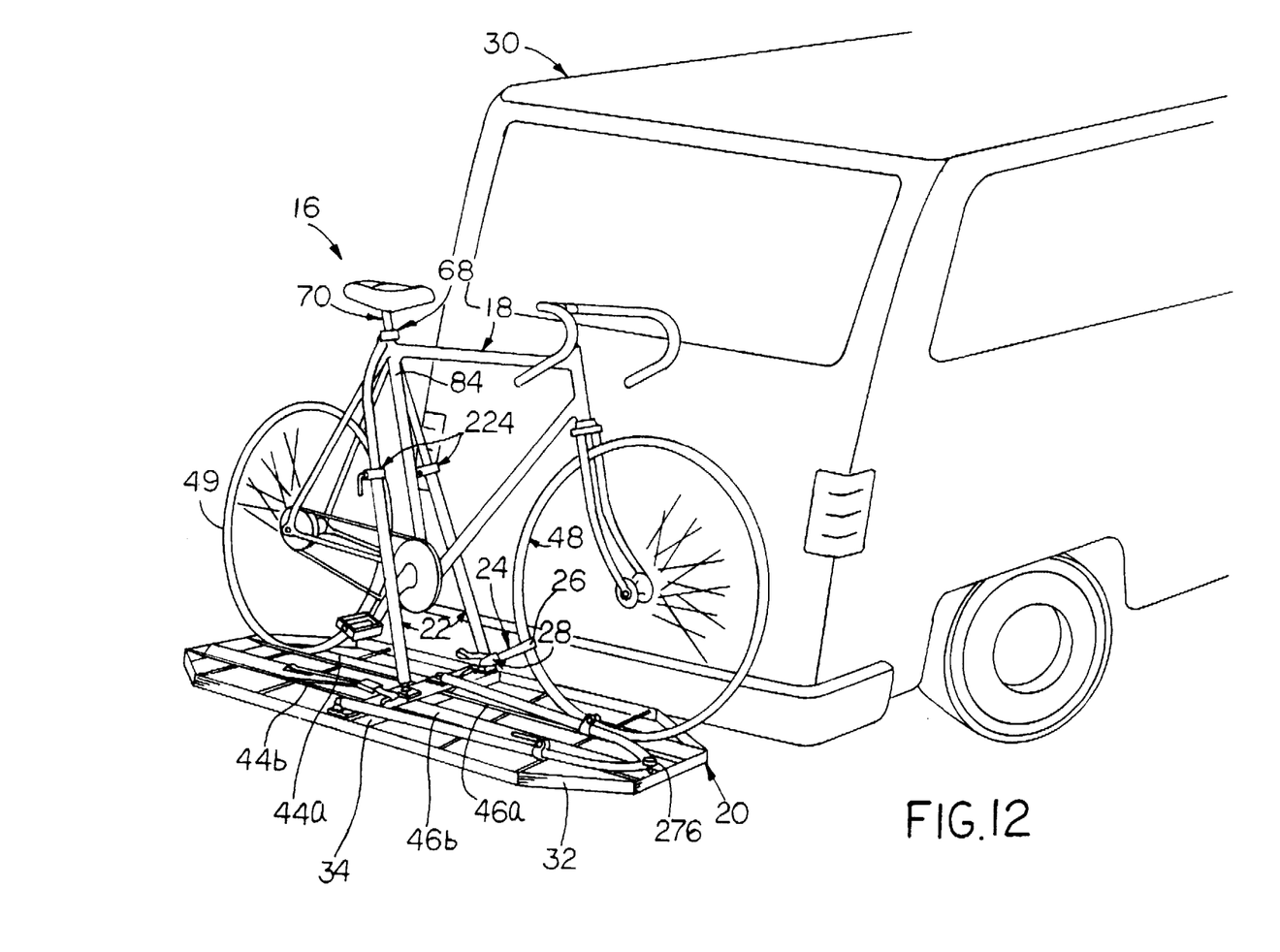
FIG. 12 is a front perspective view of a version of the racking system of the present invention securing a bicycle mounted thereon and attached to the rear of a vehicle for transportation.

FIG. 12 shows the racking system 16 with the bicycle 18 mounted on the framework 20 which is attached to the rear of a vehicle 30. In particular as depicted in FIG. 1, the framework 20 has a octogonal outer frame 32 having a main transverse member 34 attached between the front and rear side 36, 38 of the frame 32 and located generally midway between the left and right side 40, 42 of the frame 32. A pair of parallel wheel channels 44a, 44b are attached between the left side 40 of the frame 32 and the transverse member 34, and a similar pair of parallel wheel channels 46a, 46b are attached between the right side 42 of frame 32 and the transverse member 34. The front and rear wheels 48, 49 of the bicycle 18 are securely seated within their respective right and left rear wheel channels 46a, 44a such that the upwardly extending outer ends 50 of each wheel channel prevent the wheels from slipping off the framework 20. Two pairs of cross members 52a, 52b, and 54a, 54b are attached between the front and rear sides 36, 38 of the frame 32 such that one pair 52a, 52b is located between the transverse member 34 and left side 40 of the frame 32 and the other pair 54a, 54b is located between the transverse member 34 and right side 42 of the frame 32.

Figure 2:
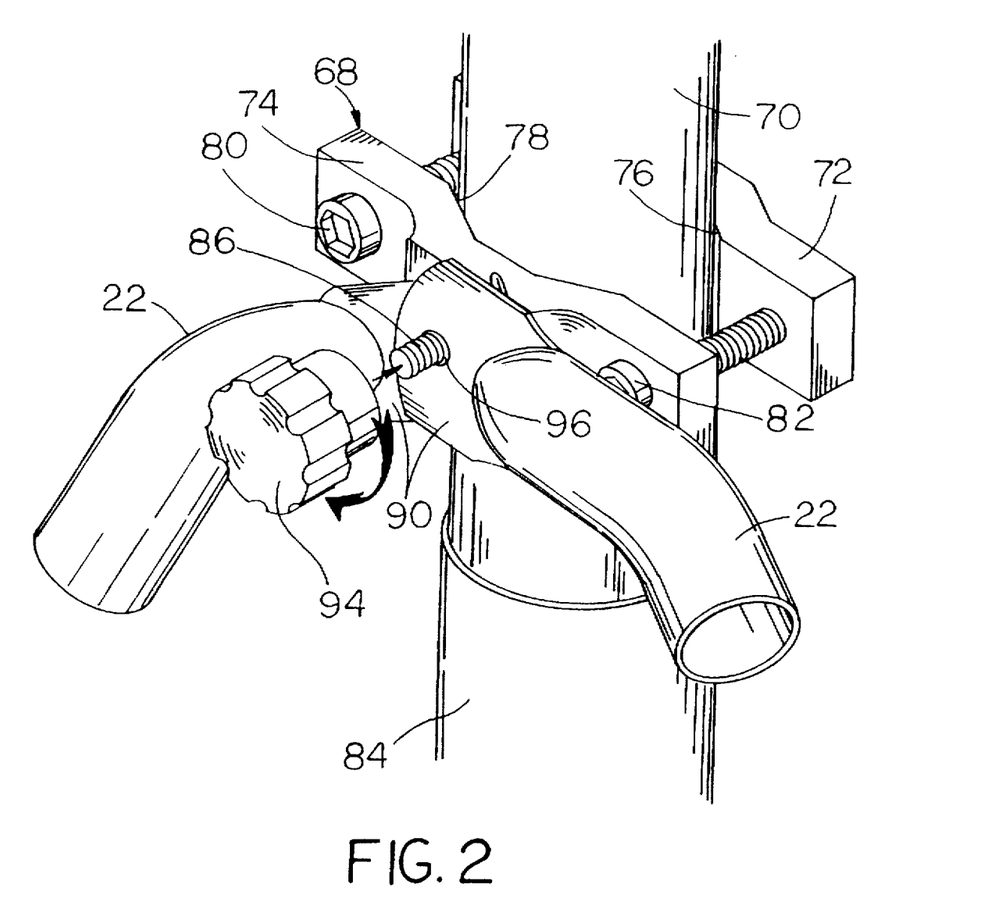
FIG. 2 is a perspective view of the clamp secured to the seat post of the bicycle with the arms and associated components secured to the clamp of the racking system of FIG. 1.

Referring to FIG. 1, the bicycle 18 is mounted to the framework 20 with the front wheel 48 seated within the right rear wheel channel 46a and the rear wheel 49 seated within the left rear wheel channel 44a as previously described. A clamp 68 is secured around the bicycle seat post 70 and the pair of telescoping arms 22 are attached to the clamp 68. As seen in FIG. 2, the clamp 68 includes a pair of opposing U-shaped half bodies 72, 74. The seat post 70 extends between the U-shaped half bodies 72, 74 and is seated within their U-shaped notches 76, 78. A pair of clamp bolts 80, 82 positioned on opposite ends of the seat post 70 threadingly engage opposing apertures of the U-shaped half bodies 72, 74. The clamp 68 is tightened around the post 70 by turning the bolts 80, 82 clockwise which moves the U-shaped half bodies 72, 74 toward each other increasing the frictional force between the U-shaped half bodies 72, 74 and seat post 70. It should be noted that the clamp 68 can also, if desired, rest on top of the bicycle frame tube 84 while clamped onto the seat post 70 or modified to clamp around the frame tube 84 or other component.

Figure 3:
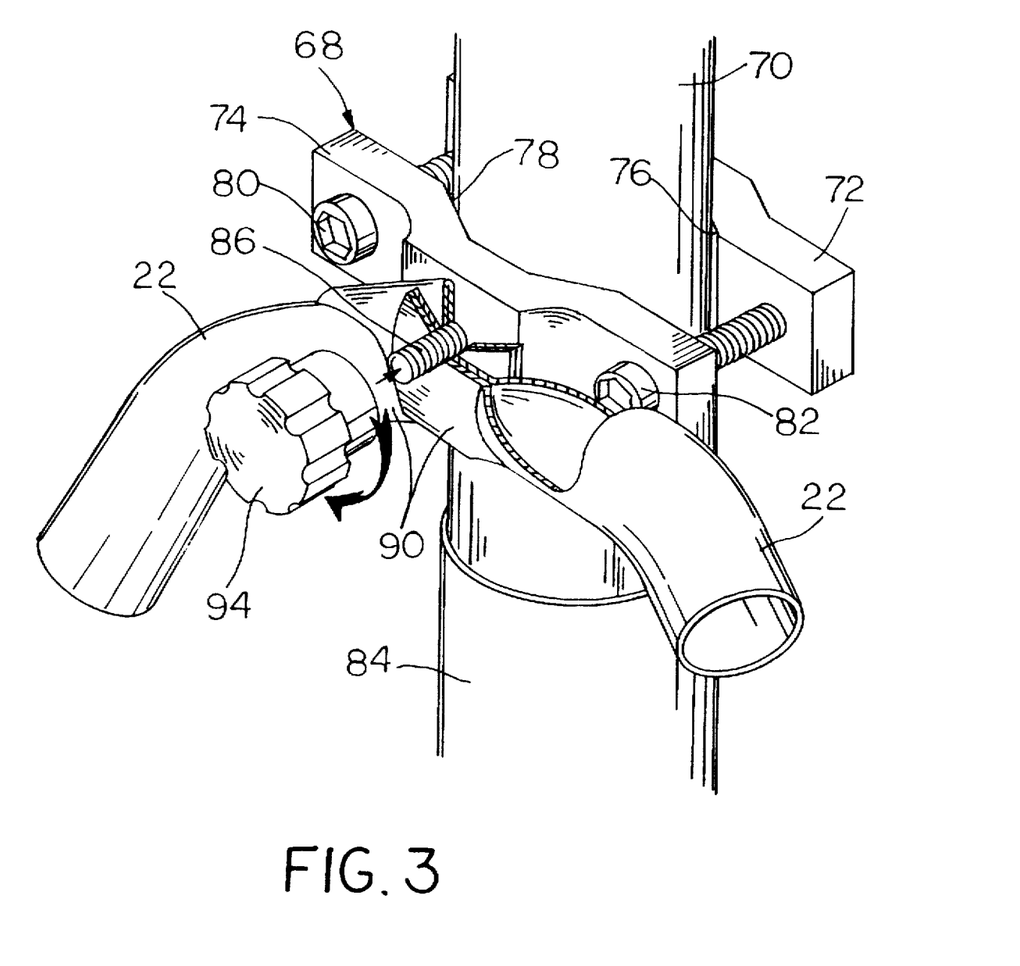
FIG. 3 is a view similar to FIG. 2 with sections cut away for illustrative purposes.

As illustrated in FIG. 3, a threaded stud 86 is attached to the center of the rear side 88 (with respect to the bicycle) of the rear U-shaped half body 74 and extends outwardly towards the rear wheel 49 of the bicycle. As also illustrated in FIGS. 2 and 3, each of the telescoping arms 22 include generally flattened hand portions 90 integrally formed at one end and having central apertures 96. The arms 22 are removably secured to the clamp 68 by overlapping the hand portions 90, which are curved towards each other, so that the apertures 96 are aligned to permit insertion of the stud 86 through the apertures 96. A knob 94 is turned clockwise by a user onto the stud 86 and threadily engages the stud 86 in the direction of the arrows until the knob 94 presses against the hands 90 thereby tightening the arms 22 against the clamp 68.

Figure 11:
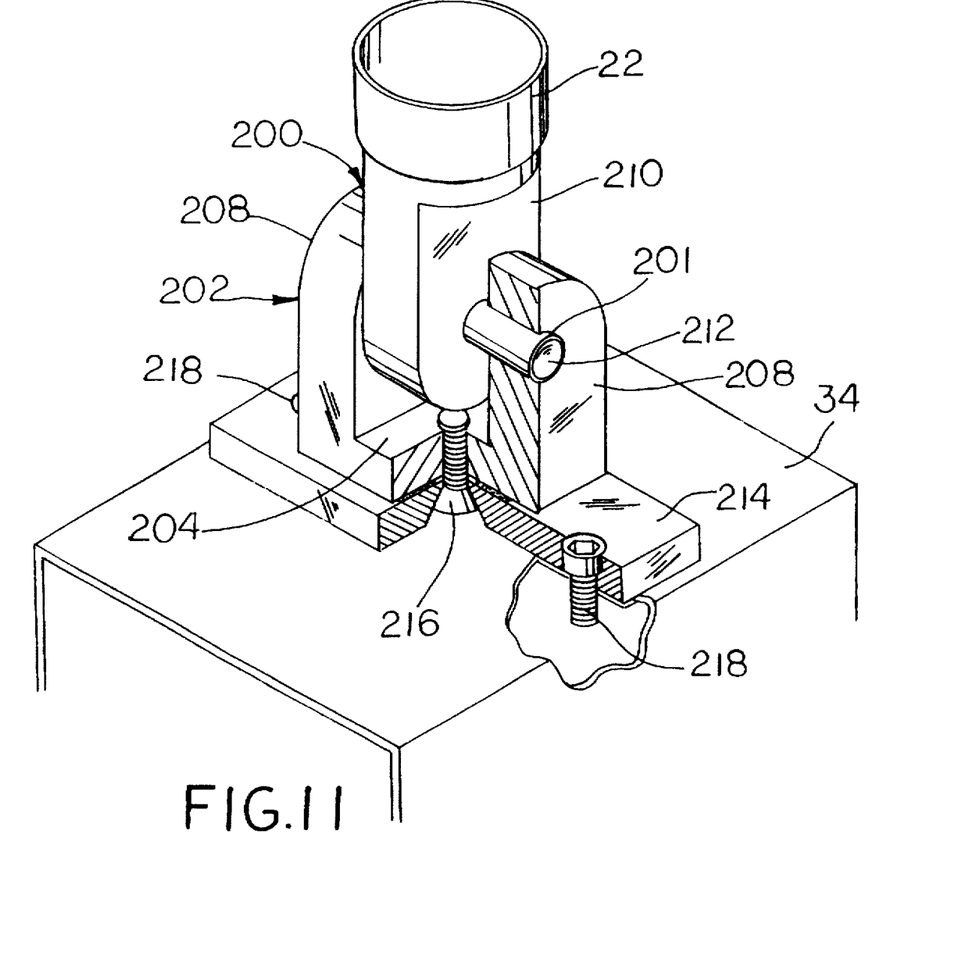
FIG. 11 is a partial sectional view of the universal joint and associated components of the racking system.

As shown in FIG. 1, the telescoping arms 22 extend diagonally downward to the framework 20 towards the front wheel 48 on opposite sides of the bicycle 18 and diverge away from each other. As illustrated in FIG. 11, each of the telescoping arms 22 are pivotally connected to the framework 20 by a swivel joint 200. In more detail, the joint comprises an inverted U-shaped bracket 202 having an inverted U-shaped notch 204 and aligned apertures 201 formed in the opposing outer portions 208. A coupling element 210 having a pin 212 is attached at the lower end of the arm 22 and is seated into the notch 204 of the bracket such that the pin 212 is inserted into the bracket apertures 201 for rotational engagement, thereby allowing the arms 22 to swivel or pivot from a use position to a stowed position. The bracket 202 is mounted to a support plate 214 by a mounting screw 216, and the support plate 214 is mounted to the transverse member 34 by a pair of alien screws 218.

Figures 4, 5:
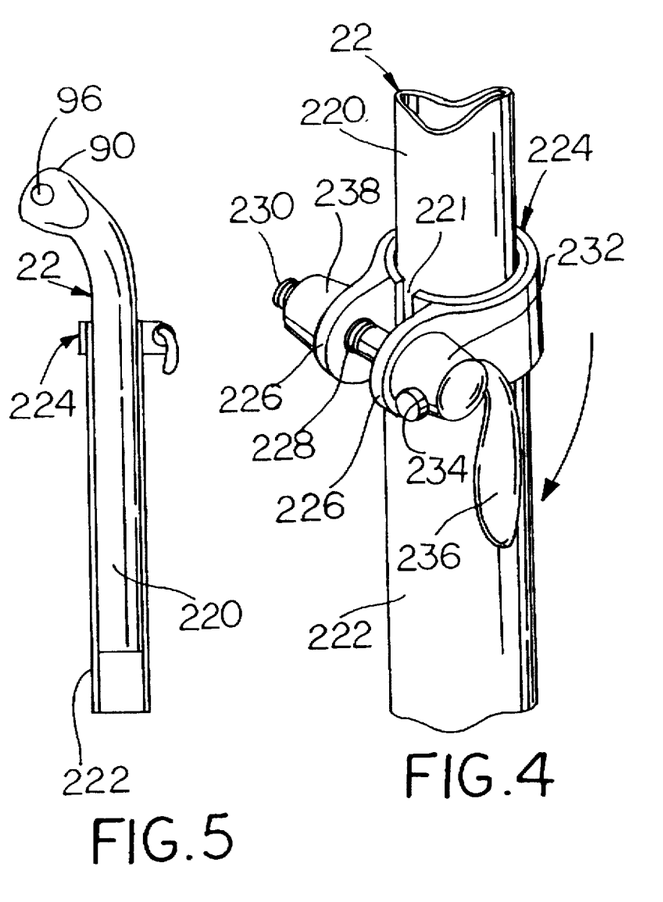
FIG. 4 is a perspective view of the portion of the arm with the tube clamp of the racking system of FIG. 1.
FIG. 5 is a partial sectional view of the arm of the racking system in a retracted position.
Figure 6:
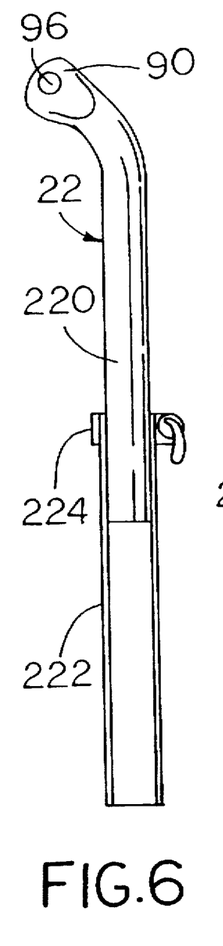
FIG. 6 is a partial sectional view of the arm of the racking system in an extended position.

As shown in FIGS. 4 through 6, each of the telescoping arms 22 is comprised of an inner tube 220 slidingly inserted inside an outer tube 222. A C-shaped tube clamp 224 is inserted around the outer tube 222 at its upper end. As seen in FIG. 4, the tube clamp 224 includes a pair of opposing end extensions 226 having aligned apertures 228 for receiving a threaded clamp bolt 230. The bolt 230 includes a cone shaped head portion 232 having a side aperture 234 for receiving a lever 236. A cone nut 238 is turned onto the other end of the bolt 230 until it abuts the outer surface of the adjacent extension 226. The tube clamp 224 is tightened by moving the lever 236 in the direction indicated by the arrow causing the bolt 230 to rotate clockwise thereby moving the extensions 226 toward each other which increases the clamping force around the tubes. The outer tube 222 has a slit 221 extending from the upper end of the tube 222 to the lower end of the clamp 224 to allow the outer tube 222 to constrict thereby clamping the tubes together when the clamp 224 is tightened.

To adjust the length of the arm 22, the clamp 224 is first loosened by moving the lever 236 in the opposite direction, the inner tube 220 is slid along the outer tube 222 at the desired position, and the clamp 224 is tightened as previously described. As can be readily seen, these arms 22 can be adjusted to accommodate bicycles of various sizes and designs. For example, the arm 22 can be in a fully retracted position with inner tube 220 moved almost completely into the outer tube 222 to accommodate a small bicycle as seen in FIG. 5, or the arm 22 can be in a fully extended position with the inner tube 220 moved almost completely out of the outer tube 222 to accommodate a large bicycle as seen in FIG. 6.

Figure 16:
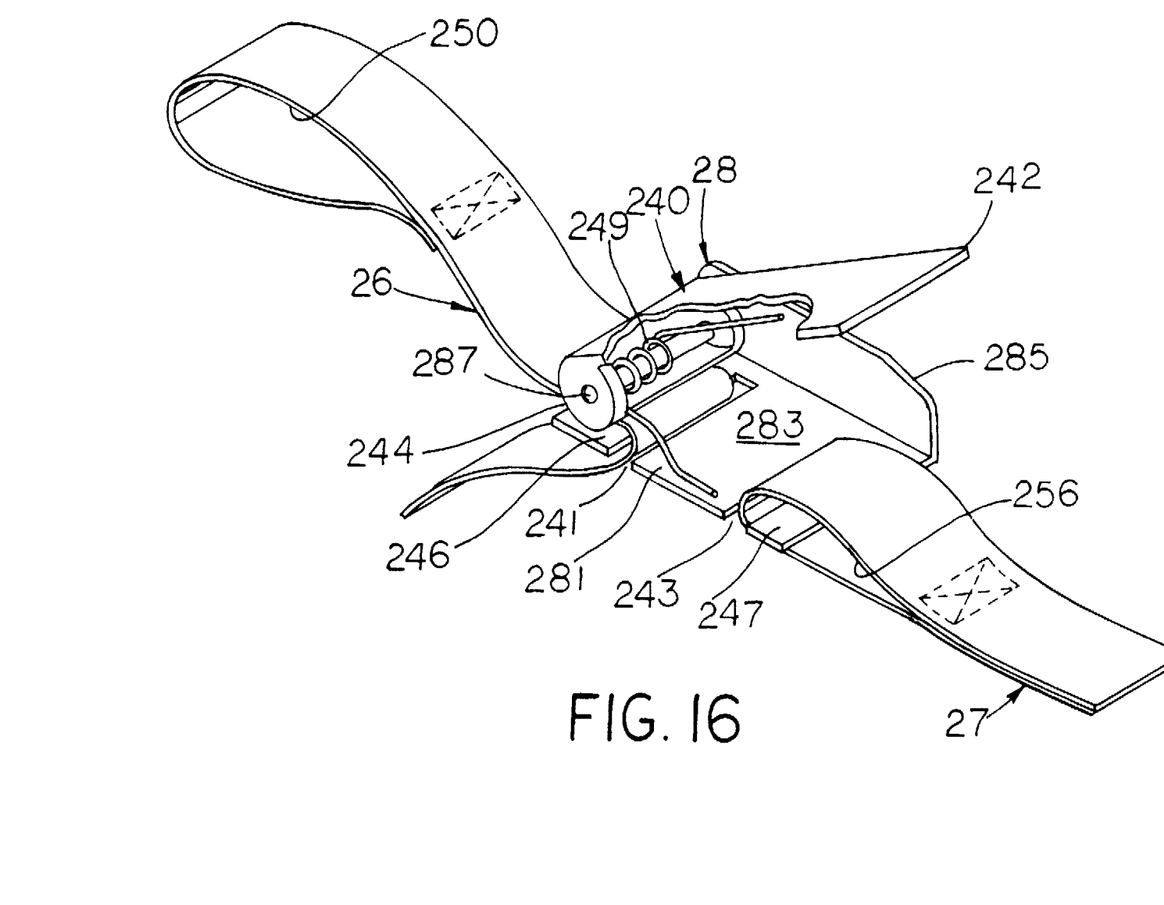
FIG. 16 is a cutaway perspective view of the cam buckle securing the straps.

Referring to FIGS. 1, 7–9 and 16, the tensioning mechanism 24 comprises a tightening strap 26 and an anchoring strap 27, each having their ends wrapped around and stitched to the strap to form looped ends 250, 252, 254, 256 that are secured to cam and side-release buckles 28, 29. The straps 26, 27 are composed of a flexible yet durable material such as Nylon and the cam and side-release buckles 28, 29 are composed of plastic or other lightweight and durable material. The cam buckle 28 as shown in FIG. 16 includes a lever 240 having a handle 242 and being pivotally connected by a pin 287 through the curved body 244 of the lever 240 at the side wall 285 of the cam buckle 28. The cam buckle 28 has a bottom wall 283 having a pair of slits 241, 243 defining outer crosspieces 246, 247 and middle crosspiece 281. A coil spring 249 is coiled around the pin 287 and has one end pressing upwardly on the handle 242 and the other end pressing upon the middle crosspiece 281 thereby causing the handle 242 to be spring loaded upwardly. A pair of spaced crosspieces 246 are attached between the sides of the cam buckle 28.

Figure 8:
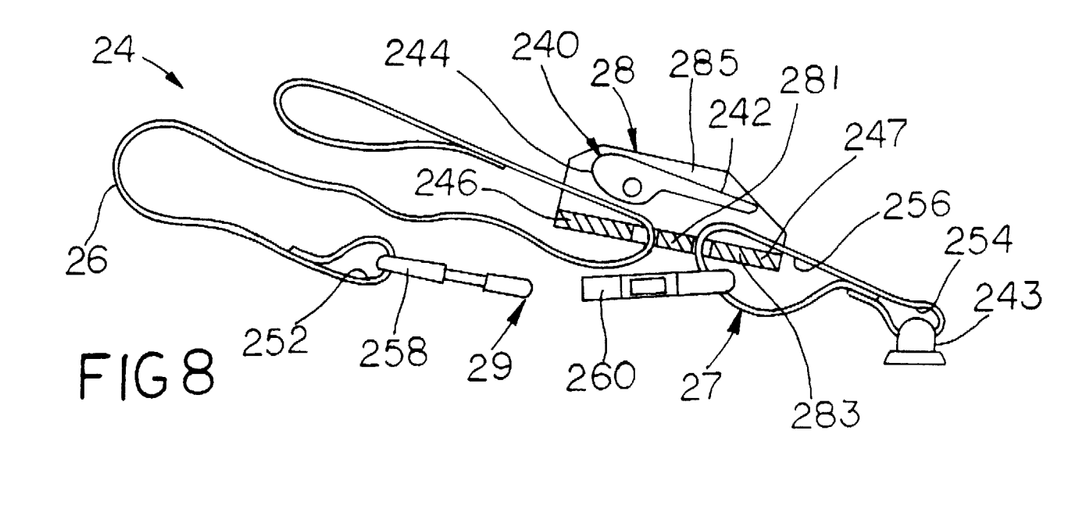
FIG. 8 is a partial sectional view of the tension mechanism of the racking system disconnected from the bicycle with the tightening strap slackened and disengaged from the lever of the cam buckle.
Figure 9:
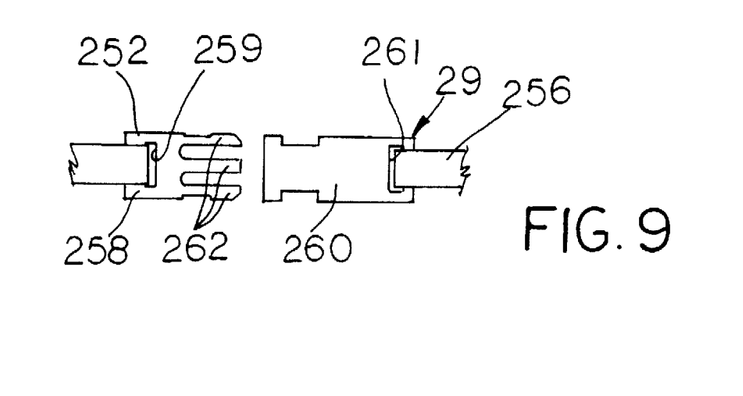
FIG. 9 is a top view of the side release buckle of the version of the racking system.

As seen in FIG. 8 showing the straps slackened and buckles detached, the tightening strap 26 extends through the slit 241 between the outer crosspieces 246 and middle crosspiece 281 of the cam buckle 28 and is sandwiched between the cam lever 240 and the opposing outer crosspiece 246. One looped end 252 of the tightening strap extends through a slit 259 formed in the male portion 258 of the side-release buckle 29 and the other looped end 250 extends freely beyond the cam buckle 28. The anchoring strap 27 has one looped end 254 extending through a hook 243 mounted to the transverse member 34 of the framework 20, and the other end extending through the other slit 243 of the cam buckle 28 and a slit 261 in the female portion 260 of the side-release buckle 29. As seen in FIG. 9, the male portion 258 of the side-release buckle 29 includes three fingers 262 which matingly engage the female portion 260 in a commonly known assembled manner. Thus, when the male and female portions 258, 260 of the side-release buckle 29 are disengaged, the tightening strap 26 can be extended through the front wheel 48 of the bicycle 18 to secured the front wheel to the framework upon the female and male portions 258, 260 engaging together.

Figure 7:
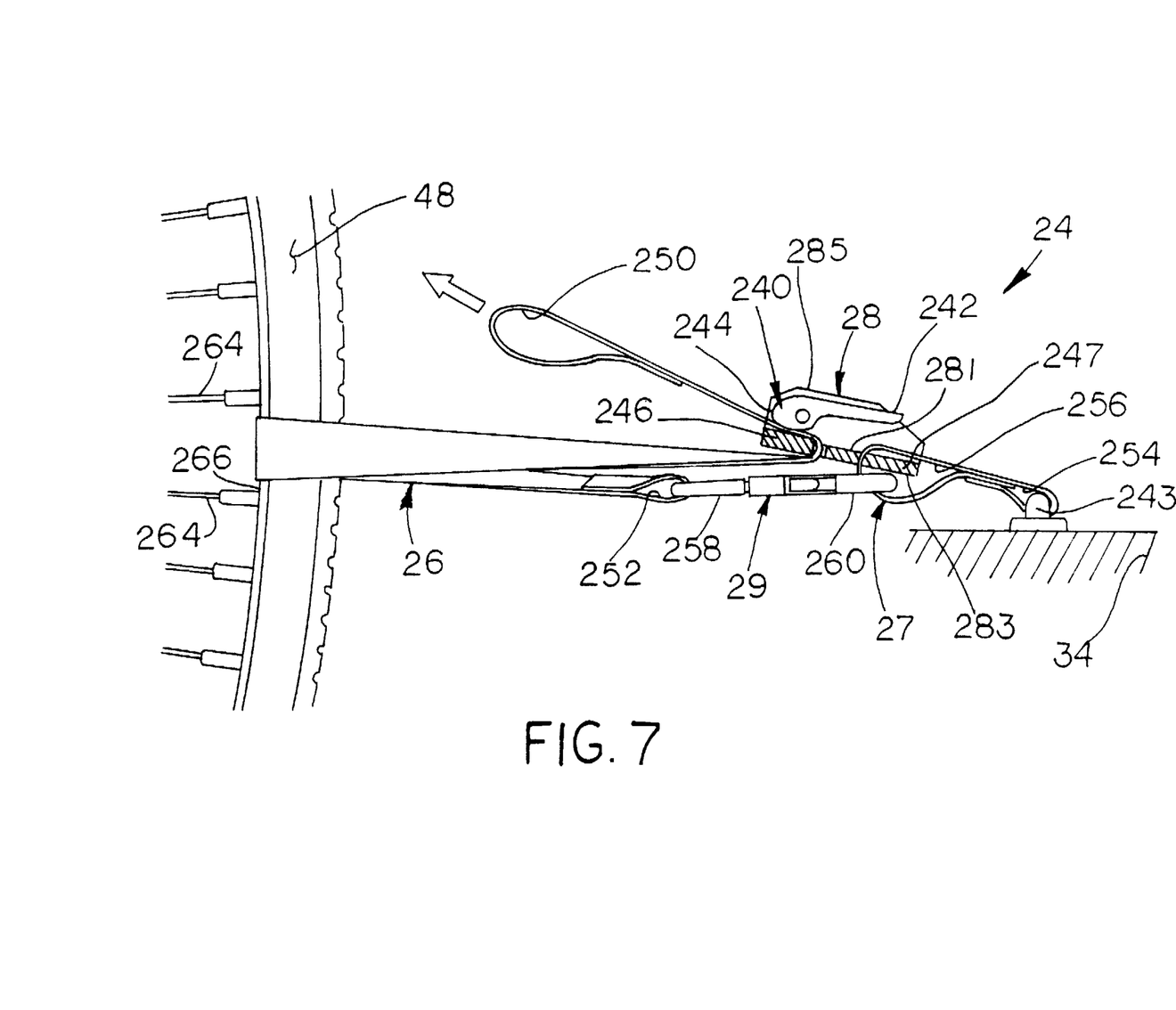
FIG. 7 is a partial sectional view of the tension mechanism of the racking system securing the front wheel of the bicycle to the framework.

Referring to FIG. 7, the tightening strap 26 extends through the bicycle front wheel 48 such that it is positioned between adjacent wheel spokes 264 and abuts against the rim 266 of the wheel. The side-release buckle is assembled as previously described. To tighten the tightening strap 26, a user grasps the looped end 250 and pulls the tightening strap 26 in the direction of the arrow until the desired tension is attained. The user then releases the looped end 250 which permits the spring to push the handle 242 of the lever 240 upwardly. This action causes the curved body 244 of the lever 240 to press the tightening strap 26 against the crosspiece 246 creating sufficient frictional force between the tightening strap 26 and crosspiece 246 to lock the tightening strap 26 in place.

Figure 13:
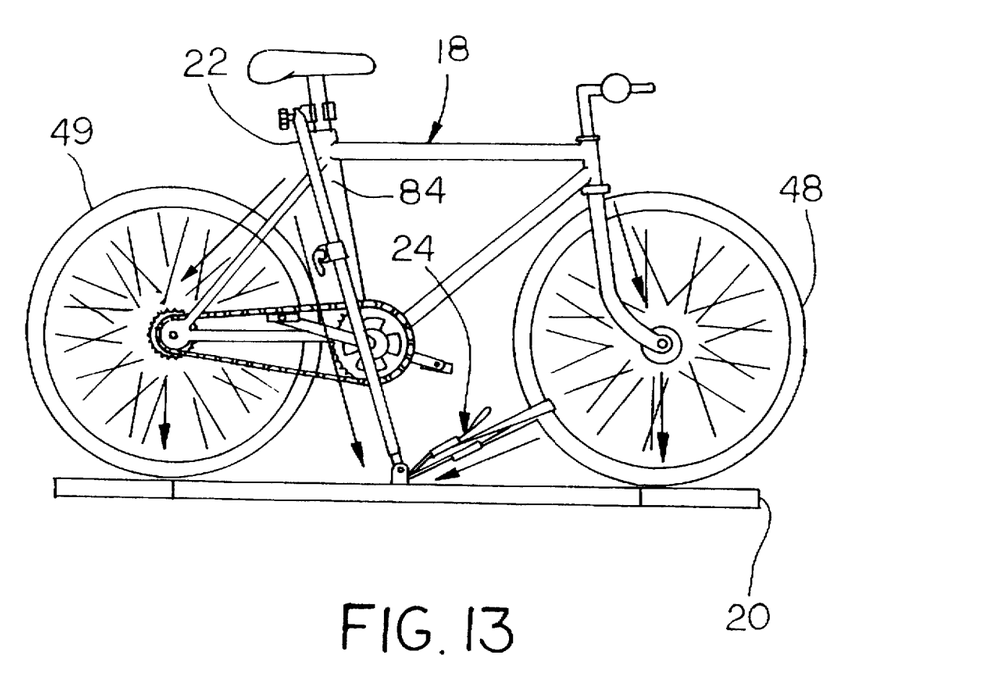
FIG. 13 is a front elevational view of FIG. 1 with arrows to indicate the forces imparted on the bicycle by the racking system.

At this assembled position as illustrated in FIG. 1, the bicycle 18 is rigidly loaded against the framework 20 by the forces imparted on the bicycle frame 84 as illustrated by the arrows in FIG. 13. The tension mechanism 24 applies a static downward and rearward force (with respect to the bicycle) on the bicycle 18, which is counteracted by a static downward and forward force on the bicycle 18 from the arms 22. These forces provide a downward load which is well-balanced between the front and rear wheels 48, 49 which provides optimal loading characteristics and also serves to eliminate all looseness in the rack. In essence, the telescoping arms 22 provide lateral stability in both tension and compression and the combination of the arms 22 and tension mechanism 24 provide fore-aft stability.

Figure 10:
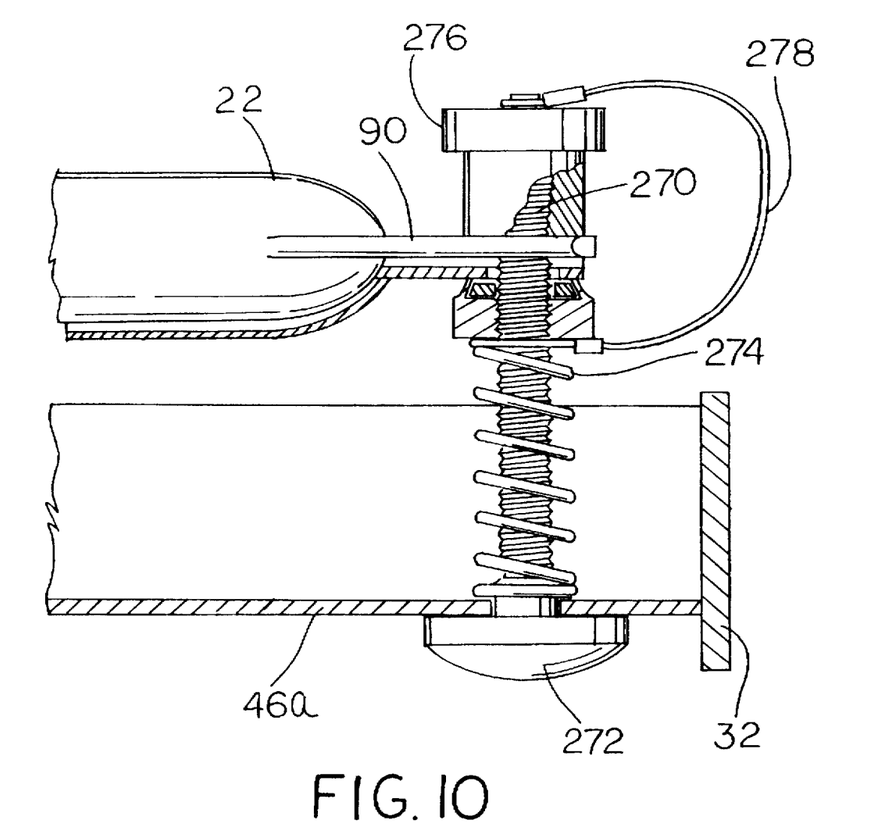
FIG. 10 is a partial sectional view of the stow bolt and associated components securing the arms to the framework in a stowed position.

When the bicycle 18 is not mounted on the framework 20, the unused arms 22 are stowed in a folded position by loosening the tube clamps 224, pivotally moving the arms 22 to the framework 20, and adjusting the arms 22 for attachment to a stow bolt 270 which is secured to the framework 20. As seen in FIG. 10, the threaded stow bolt 270 extends through the right wheel channel 46a near the outer frame 32 with its head 272 abutting against the bottom of the wheel channel 46a. The stow bolt 270 also extends through a spring 274 which provides added support and stability. A knob 276 is turned clockwise onto the stow bolt 270 threadingly engaging the stow bolt 270 until it presses against the spring 274, thereby securing the arms to the stow bolt. A tether cable 278 is connected to the knob 276 and stow bolt 270 to prevent the knob 276 from being lost or misplaced. The unused tightening strap 26 can be stored in many different ways, including wrapping the loose end 250 around the framework (as if it were a bicycle wheel) and then tightening it against the framework 20 as previously described.

Thus as can be seen, the racking system 16 provides for easy installation of a bicycle 18 in a rigid position on a framework 18. A user simply places the bicycle wheels 48, 49 in the wheel channels 46a, 44a. Then, the telescoping arms 22 are unlocked from the stow bolt 270 by turning the knob 276 counterclockwise to remove it. Next, the lever 236 of the tube clamp 224 is moved counterclockwise to unclamp the tubes and then the arms 22 are pivotally moved to the seat post 70, and adjusted in length for insertion around the stud 86 through the apertures 96 at their hands 90. The user then moves the lever 236 clockwise to clamp the tubes together and then turns the knob 94 clockwise onto the stud 86 to tightly secure the arms 22 to the stud 86. The tightening strap 26 is then extended through the front wheel 48 and attached to itself by buckling the male 260 and female portions 258 of the side-release buckle 29. The user then grasps the free looped end 250 of the tightening strap 26 and pulls it at the desired tension.

Figure 14:
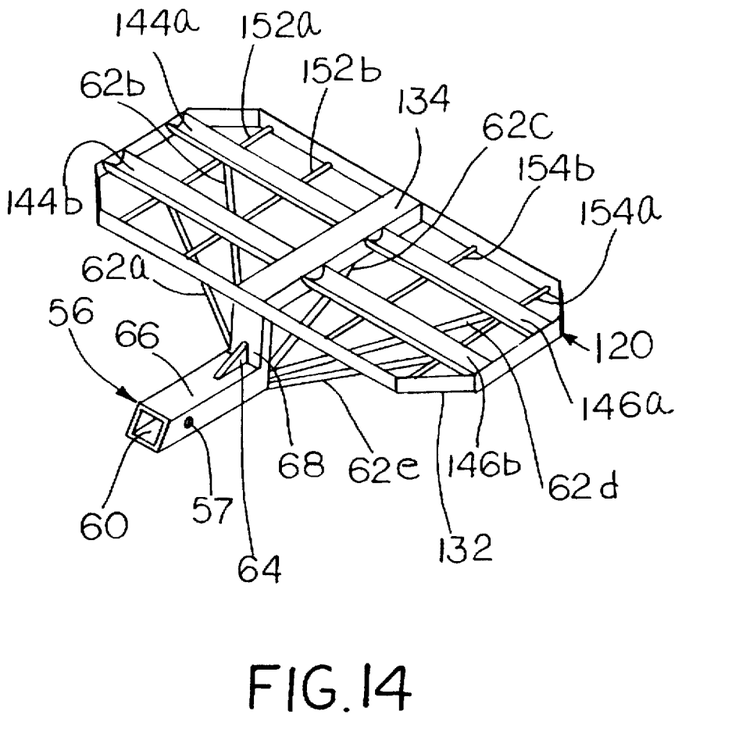
FIG. 14 is a perspective view of another embodiment of the racking system showing the framework adapted for mounting to a receiver hitch of a vehicle.
Figure 15:
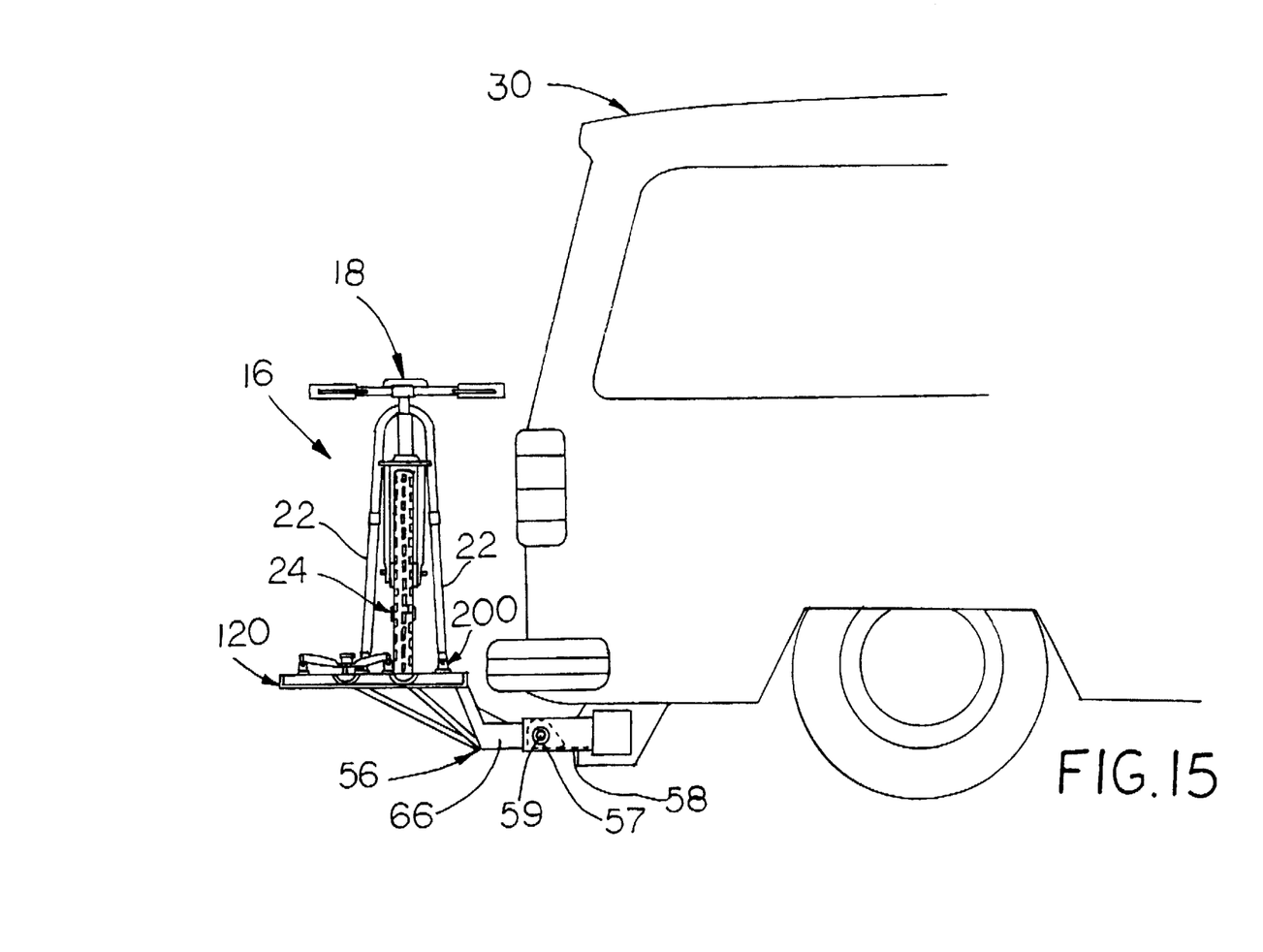

In one embodiment of the invention as seen in FIG. 14, an L-shaped tubular member 56 with a lateral aperture 57 and front opening 60 is integrally formed at the front end of the transverse member 134 for insertion into a receiver hitch 58 (FIG. 15). For added support to the framework 120, five diagonal struts 62a, 62b, 62c, 62d, and 62e are attached to the rear of the lower leg of the tubular member and extend to the frame 132. In particular, the left outer strut 62a is attached to the left outer cross member 152a directly under the left front wheel channel 144b. The left inner strut 62b is attached to the left outer cross member 152a directly under the left rear wheel channel 144a. The center strut 62c is attached to the transverse main member 134 near the rear wheel channels 144a, 146a. The right inner strut 62d is attached to the right outer cross member 154a directly under the right rear wheel channel 146a, and the right outer strut 62e is attached to the right outer cross member 154a directly under the right front wheel channel 146b. Also, a triangularly shaped support plate 64 is mounted to the tubular member 56 at the top surface of the lower leg 66 and the front surface of the upper leg 68 to provide support in preventing the legs from bending or twisting, especially at their intersection.

FIG. 15 depicts a bicycle 18 being transported and secured by the racking system 16 of FIG. 14. The bicycle 18 is secured to the framework 120 by the telescoping arms 22 and tension mechanism 24 as stated in the other embodiment. The arms 22 are also pivotally connected to the framework 120 by swivel joints 200 and stowed to the framework 120 as stated in the other embodiment. The tubular member 56 is inserted into the receiver hitch 58 of a vehicle 30 and locked in place by a pin 59 inserted through aligned lateral apertures in the lower leg 66 of the tubular member 56 and receiver hitch 58. It should be noted that the framework 120 can be secured to the vehicle in other ways. For example, the framework can be mounted on the bumper or hood of a vehicle.

As seen in FIG. 1, the racking system 16 of this embodiment can accommodate two bicycles. The bicycles would be mounted in close proximity to each other by alternating the orientation of the bicycle one hundred and eighty degrees in sequential wheel channels 44a, 44b, and 46a, 46b. The arms 22 for the bicycles are overlapped in an alternating pattern as shown in FIG. 1 to provide the widest possible base dimension between joints 200. It should be noted that the racking system can be easily modified to accommodate bicycles of any number without departing from the spirit, skill and scope of the invention.

Additional changes and modifications to the embodiments of the invention as described herein can also be made, as will be apparent to those skilled in the art, while still remaining within the spirit and scope of the disclosed invention as set forth in the appended claims.

What is claimed is:

1. A combination of a racking system and a bicycle, said racking system comprising:

a framework, said bicycle being positioned upon said framework, said bicycle having a seat post;

at least a pair of arms secured to said framework and removably secured to said seat post, said arms extending downwardly from said bicycle to said framework on opposite sides of said bicycle for laterally supporting said bicycle, said arms being adjustable to accommodate bicycles of different sizes and designs, each of said arms are telescoping having an inner tube slidingly inserted into an outer tube, each of said arms further including securing means for securing said inner and outer tube together at a desired arm length; and tension means connected to said framework and said bicycle for tightening said bicycle to said framework.

2. A combination of a racking system and a bicycle, said racking system comprising:

a framework, said bicycle being positioned upon said framework, at least a pair of arms secured to said framework and removably secured to said bicycle, said arms extending downwardly from said bicycle to said framework on opposite sides of said bicycle for laterally supporting said bicycle, said arms being adjustable to accommodate bicycles of different sizes and designs, said arms being pivotally secured to said framework so as to pivotally move from a used position wherein said arms are removably secured to said bicycle to a stowed position wherein said arms are removably secured to said framework; and tension means connected to said framework and said bicycle for tightening said bicycle to said framework.

3. The combination of claim 2 wherein said arms are pivotally secured to said framework by a swivel joint.

4. The combination of claim 2 wherein said arms are stored against said framework by fastening said arms to a stow bolt.

5. A combination of a racking system and a bicycle, said racking system comprising:

a framework, said bicycle having a front wheel and a rear wheel positioned upon said framework;

at least a pair of arms secured to said framework and removably secured to said bicycle, said arms extending diagonally downwardly from said bicycle to said framework and toward said front wheel on opposite sides of said bicycle for laterally supporting said bicycle; and tension means connected to said framework and said bicycle for tightening said bicycle to said framework, said tension means including a cam buckle attached to said framework and a strap extending through the front wheel of said bicycle and said cam buckle to said framework towards said rear wheel so that said bicycle is stable from fore to aft, said cam buckle frictionally engaging said strap to secure said strap at a desired tension.

6. The combination of claim 5 wherein said tension means includes a buckling means attached to said strap and said framework for removably connecting said strap to said framework so that said strap can extend through said front wheel of said bicycle when said strap is disconnected from said framework and then secured to said front wheel of said bicycle to said framework when said strap is connected to said framework.

* * * * *